United States Patent
Bohn et al.

(10) Patent No.: US 8,804,324 B2
(45) Date of Patent: Aug. 12, 2014

(54) FLEXIBLE DISPLAY OVERCENTER ASSEMBLY

(75) Inventors: David D. Bohn, Fort Collins, CO (US); Paul M. O'Brien, Sammamish, WA (US); Christopher B. Fruhauf, San Anselmo, CA (US)

(73) Assignee: Microsoft Corporation, Redwood, WA (US)

( * ) Notice: Subject to any disclaimer, the term of this patent is extended or adjusted under 35 U.S.C. 154(b) by 163 days.

(21) Appl. No.: 13/153,092

(22) Filed: Jun. 3, 2011

(65) Prior Publication Data

US 2012/0307472 A1 Dec. 6, 2012

(51) Int. Cl.
*H05K 7/00* (2006.01)
*H05K 5/00* (2006.01)

(52) U.S. Cl.
USPC ............ 361/679.27; 361/679.28; 361/679.06; 361/679.55; 361/679.21; 455/575.4; 345/1.1

(58) Field of Classification Search
USPC ............. 361/679.27, 679.06, 679.55, 679.22; 455/575.4, 575.3; 345/1.1; 248/175
See application file for complete search history.

(56) References Cited

U.S. PATENT DOCUMENTS

| | | | |
|---|---|---|---|
| 5,712,760 A | 1/1998 | Coulon et al. | |
| 6,006,243 A | 12/1999 | Karidis | |
| 6,016,176 A * | 1/2000 | Kim et al. | 349/84 |
| 6,170,120 B1 | 1/2001 | Lu | |
| 6,230,365 B1 | 5/2001 | Lu | |
| 6,577,496 B1 * | 6/2003 | Gioscia et al. | 361/679.3 |
| 6,751,473 B1 | 6/2004 | Goyal et al. | |
| 6,859,357 B2 | 2/2005 | Morimoto et al. | |
| 7,127,776 B2 * | 10/2006 | Park | 16/239 |
| 7,200,224 B2 | 4/2007 | Park et al. | |
| 7,336,782 B2 | 2/2008 | Watanabe et al. | |
| 7,345,872 B2 | 3/2008 | Wang | |
| 7,374,424 B1 * | 5/2008 | Nurmi et al. | 439/31 |
| D580,432 S * | 11/2008 | Yun et al. | D14/345 |
| 7,714,801 B2 | 5/2010 | Kimmel | |
| 7,970,442 B2 | 6/2011 | Chiang | |
| 8,228,678 B2 * | 7/2012 | Hasegawa et al. | 361/755 |
| 2002/0067339 A1 * | 6/2002 | Min | 345/156 |

(Continued)

OTHER PUBLICATIONS

"Cell Phone FPCs", Retrieved from: <http://www.hiwtc.com/products/cellphone-fpcs-33754121-12743.htm> on Feb. 21, 2011, 2 pages.

"Nokia 888 Mobile Phone by Tamer Nakisci", Retrieved from: <http://www.yankodesign.com/2005/09/30/nokia-888-mobile-phone-by-tamer-nakisci/> on Mar. 29, 2011,(Sep. 30, 2005), 22 pages.

(Continued)

*Primary Examiner* — Adrian S Wilson
*Assistant Examiner* — Abhishek Rathod
(74) *Attorney, Agent, or Firm* — Judy Yee; Micky Minhas

(57) ABSTRACT

In embodiments of a flexible display overcenter assembly, an overcenter assembly includes a first flange integrated in a first housing part of a foldable electronic device. The device includes a flexible display, and the first housing part is integrated with a first section of the flexible display. The overcenter assembly also includes a second flange integrated in a second housing part of the foldable electronic device, and the second housing part is integrated with a second section of the flexible display. The first and second flanges are implemented to fold and form a radius that supports the flexible display in a closed position of the device. Hinge assemblies are implemented to movably couple the first and second housing parts of the foldable electronic device, and the flexible display bends through a pivot axis of the hinge assemblies when the first and second housing parts of the device are closed.

17 Claims, 8 Drawing Sheets

(56) References Cited

U.S. PATENT DOCUMENTS

| | | |
|---|---|---|
| 2002/0104769 A1 | 8/2002 | Kim et al. |
| 2004/0052044 A1 | 3/2004 | Mochizuki et al. |
| 2004/0091101 A1 | 5/2004 | Park et al. |
| 2004/0244146 A1 | 12/2004 | Park |
| 2005/0208807 A1 | 9/2005 | Lin |
| 2006/0018102 A1 | 1/2006 | Soderlund |
| 2006/0146488 A1* | 7/2006 | Kimmel ................ 361/681 |
| 2006/0238494 A1 | 10/2006 | Narayanaswami et al. |
| 2006/0238970 A1 | 10/2006 | Ukonaho et al. |
| 2007/0097014 A1* | 5/2007 | Solomon et al. ............. 345/1.1 |
| 2007/0127199 A1 | 6/2007 | Arneson |
| 2008/0167095 A1* | 7/2008 | Kim et al. ............... 455/575.3 |
| 2008/0253073 A1 | 10/2008 | Kee et al. |
| 2010/0043174 A1 | 2/2010 | Bestle et al. |
| 2010/0071155 A1* | 3/2010 | Ueyama et al. ............. 16/250 |
| 2010/0075717 A1* | 3/2010 | Ou ......................... 455/566 |
| 2010/0117975 A1 | 5/2010 | Cho |
| 2010/0182288 A1 | 7/2010 | Misawa |
| 2010/0232100 A1 | 9/2010 | Fukuma et al. |
| 2010/0238098 A1 | 9/2010 | Watanabe |
| 2010/0294556 A1 | 11/2010 | Chuo et al. |
| 2011/0205695 A1 | 8/2011 | Hassemer et al. |
| 2012/0002360 A1* | 1/2012 | Seo et al. ................. 361/679.01 |
| 2012/0044620 A1* | 2/2012 | Song et al. ............... 361/679.01 |
| 2012/0162866 A1 | 6/2012 | Bohn et al. |
| 2012/0194972 A1 | 8/2012 | Bohn et al. |
| 2012/0257368 A1* | 10/2012 | Bohn et al. .................... 361/809 |
| 2012/0262367 A1* | 10/2012 | Chiu et al. ..................... 345/156 |
| 2012/0307423 A1 | 12/2012 | Bohn et al. |
| 2012/0314399 A1 | 12/2012 | Bohn et al. |

OTHER PUBLICATIONS

Schwartz, Ariel "Kyocera Unveils Kinetic Flexible OLED Cell Phone", Retrieved from: <http://inhabitat.com/kyocera-unveils-kinetic-flexible-oled-cell-phone/> on Mar. 29, 2011,(Apr. 16, 2009), 16 pages.

"Samsung Bendable Display—Screen as Flexible As Paper", Retrieved from: <http://readatech.com/2011/01/07/samsung-bendable-display-screen-as-flexible-as-paper-1435/ on Mar. 24, 2011,(Jan. 7, 2011), 3 pages.

"Laptop/notebook lcd screen hinge", Retrieved at <<http://www.alibaba.com/product-gs/245202461/laptop_notebook_lcd_screen_hinge.html>>, Retrieved Date: Feb. 23, 2011, pp. 2.

Tan, CK, "Sleek designs hinge on strong rotary joints", Retrieved at <<http://machinedesign.com/article/sleek-designs-hinge-on-strong-rotary-joints-1104>>, Nov. 4, 2004, pp. 4.

"PCT Search Report and Written Opinion", Application No. PCT/US2012/040617, (Nov. 29, 2012), 9 pages.

"PCT Search Report and Written Opinion", Application No. PCT/US2012/041185, (Jan. 7, 2013), 9 pages.

"Final Office Action", U.S. Appl. No. 13/154,786, Dec. 27, 2013, 19 pages.

"Non-Final Office Action", U.S. Appl. No. 13/154,786, Jul. 12, 2013, 20 pages.

"Non-Final Office Action", Application No. 13/152,828, Oct. 25, 2013, 8 pages.

"Restriction Requirement", Application No. 13/152,828, Sep. 13, 2013, 6 pages.

"Final Office Action", U.S. Appl. No. 13/152,828, May 12, 2014, 14 pages.

"Non-Final Office Action", U.S. Appl. No. 13/154,786, May 19, 2014, 17 pages.

\* cited by examiner

FLEXIBLE DISPLAY OVERCENTER ASSEMBLY

BACKGROUND

Portable electronic devices, such as mobile phones, media players, and tablet computers are increasingly common. These types of devices typically include an integrated display device, and many include dual displays. For example, a mobile device can be hinged to open two display devices side-by-side to form one larger display. Users typically want the smallest possible devices to conveniently carry in a pocket or purse, but also want devices with larger display surfaces for easier viewing. Display manufacturers are beginning to develop flexible displays that may be used to provide a larger display surface than would be typically integrated in a smaller, portable electronic device. However, flexible displays are susceptible to damage from environmental factors and when folded, such as in a hinged mobile device that would typically integrate two display devices side-by-side to form the one larger display.

SUMMARY

This Summary introduces simplified concepts of a flexible display overcenter assembly, and the concepts are further described below in the Detailed Description and/or shown in the Figures. This Summary should not be considered to describe essential features of the claimed subject matter, nor used to determine or limit the scope of the claimed subject matter.

A flexible display overcenter assembly is described. In embodiments, the overcenter assembly includes a first flange integrated in a first housing part of a foldable electronic device. The foldable electronic device includes a flexible display, and the first housing part is integrated with a first section of the flexible display. The overcenter assembly also includes a second flange integrated in a second housing part of the foldable electronic device, and the second housing part is integrated with a second section of the flexible display. The first and second flanges are implemented to fold and form a radius that supports the flexible display in a closed position of the device. Hinge assemblies are implemented to movably couple the first and second housing parts of the foldable electronic device, and the flexible display bends through a pivot axis of the hinge assemblies when the first and second housing parts of the foldable electronic device are closed.

In other embodiments, the overcenter assembly includes extendable connecting links that are operable to movably couple the first and second housing parts of the foldable electronic device. An extendable connecting link includes first and second link sections that slide relative to each other to increase or decrease a length of the extendable connecting link. The extendable connecting links include a detent mechanism to apply a first torque to hold the foldable electronic device in an open position at approximately one-hundred and eighty degrees (180°), and to apply a second torque to hold the foldable electronic device in the closed position at approximately zero degrees (0°). The extendable connecting links also include an interconnection channel implemented to route an electrical interconnection between the first and second housing parts of the foldable electronic device.

BRIEF DESCRIPTION OF THE DRAWINGS

Embodiments of a flexible display overcenter assembly are described with reference to the following Figures. The same numbers may be used throughout to reference like features and components that are shown in the Figures.

DETAILED DESCRIPTION

A flexible display overcenter assembly is described, and embodiments can be implemented for use with a flexible display in an extendable and/or foldable electronic device. For example, a portable device, such as a mobile phone or tablet computer, may be implemented as an extendable and/or foldable electronic device that includes an integrated flexible display. A mobile phone with a flexible display can be used as a standard-size phone and then also extended or unfolded to increase the display viewing surface for a user to read emails, view a map, edit a document, and other tasks that are conveniently accomplished on a larger display.

While features and concepts of a flexible display overcenter assembly can be implemented in any number of different devices, systems, and/or configurations, embodiments of a flexible display overcenter assembly are described in the context of the following example devices, systems, and methods.

Figure 1:
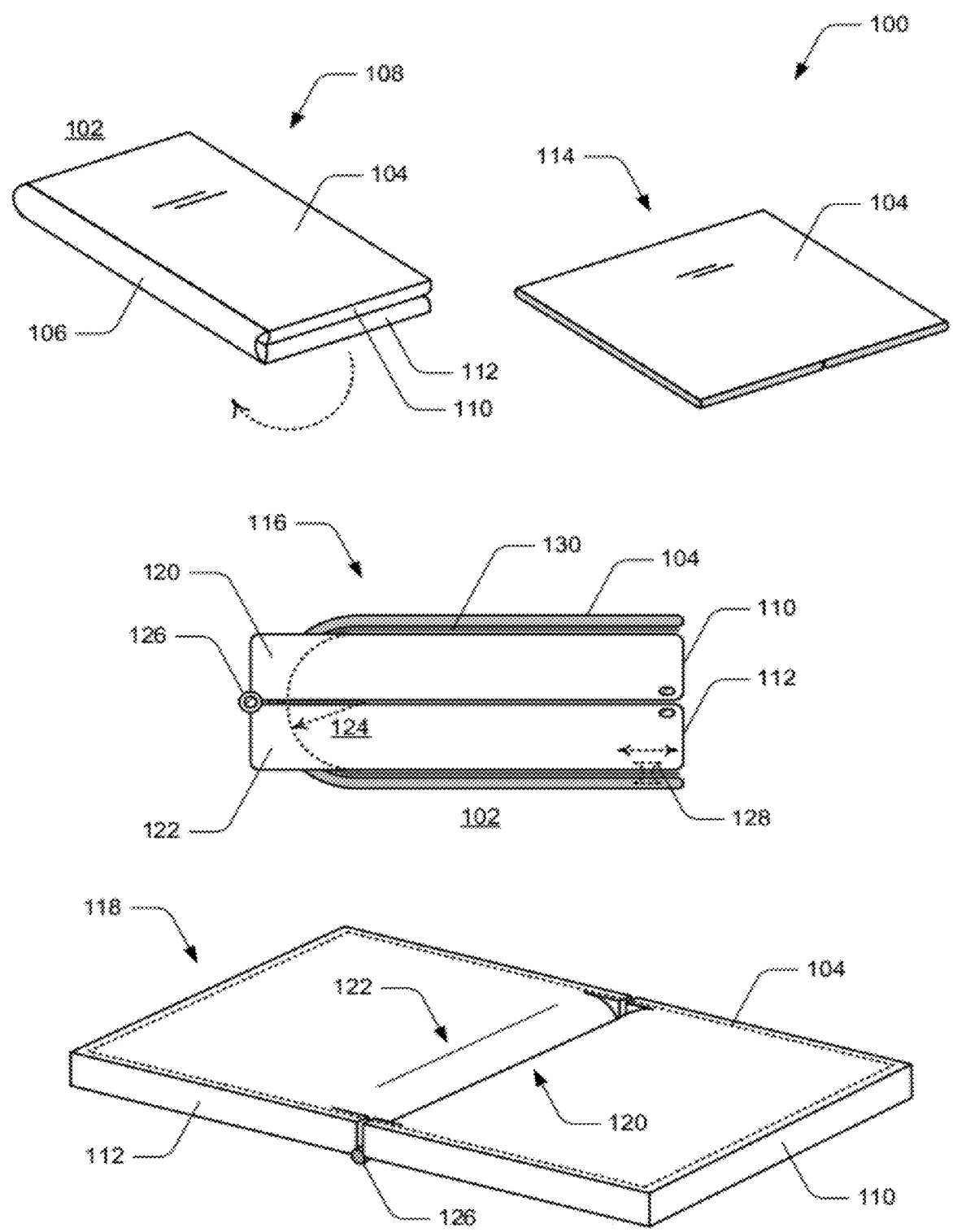
FIG. 1 illustrates examples of a flexible display overcenter assembly in accordance with one or more embodiments.

FIG. 1 illustrates examples 100 of a flexible display overcenter assembly in accordance with embodiments described herein. A foldable electronic device 102 includes a flexible display 104 and can be implemented with a flexible display overcenter assembly 106. In a first view 108, the foldable electronic device is shown in a closed position. The device includes a first housing part 110 integrated with a first section of the flexible display, and includes a second housing part 112 integrated with a second section of the flexible display. The flexible display is viewable from opposite sides of the device in the closed position (also referred to as the anti-book mode).

The first housing part 110 is movably coupled to the second housing part 112, and operable to open from the closed position at approximately zero degrees (0°) to an open position at approximately one-hundred and eighty degrees (180°). In a second view 114, the foldable electronic device 102 is shown in the open position, such as when the second housing part 112 is rotated around and up to position the first and second housing parts adjacent each other.

In a third view 116, the foldable electronic device 102 is also shown in the closed position, and the flexible display 104 bends and folds around the flexible display overcenter assembly 106 into the closed position of the device. In a fourth view 118, the foldable electronic device is also shown in the open position. The first housing part 110 is integrated with a first flange 120 of the flexible display overcenter assembly, and the second housing part 112 is integrated with a second flange 122 of the flexible display overcenter assembly. The first and second flanges fold to form a bend radius 124 of the flexible display around the folded flanges in the closed position of the device, and the folded flanges support the flexible display in the closed position. The bend radius is approximately equal to a thickness of the device in the open position.

The foldable electronic device 102 also includes hinge assemblies 126 that are implemented to movably couple the first and second housing parts of the device. The hinge assemblies can be implemented to include extendable connecting links as described with reference to FIGS. 3-5. The extendable connecting links are operable to movably couple the first and second housing parts of the foldable electronic device. The extendable connecting links can also include a detent mechanism that applies a first torque to hold the foldable electronic device in the open position at approximately one-hundred and eighty degrees (180°), and applies a second torque to hold the foldable electronic device in the closed position at approximately zero degrees (0°).

In this example, the flexible display 104 bends through a pivot axis of the hinge assembly 126 when the first and second housing parts of the foldable electronic device are closed. Additionally, the section of the flexible display that is integrated in the second housing part 112 of the device can be slide-engaged in the second housing part with a track and slide mechanism 128 to extend the flexible display to the end of the second housing part when the device is opened.

The flexible display 104 may be implemented as a flexible LCD display that is illuminated with a backlight. For example, flexible backlight 130 can be implemented to illuminate the flexible display, and the flexible backlight folds into the closed position of the foldable electronic device under the flexible display. Alternately, the flexible display may be implemented as a flexible OLED display that self-emits without the need for a flexible backlight.

Figure 2:
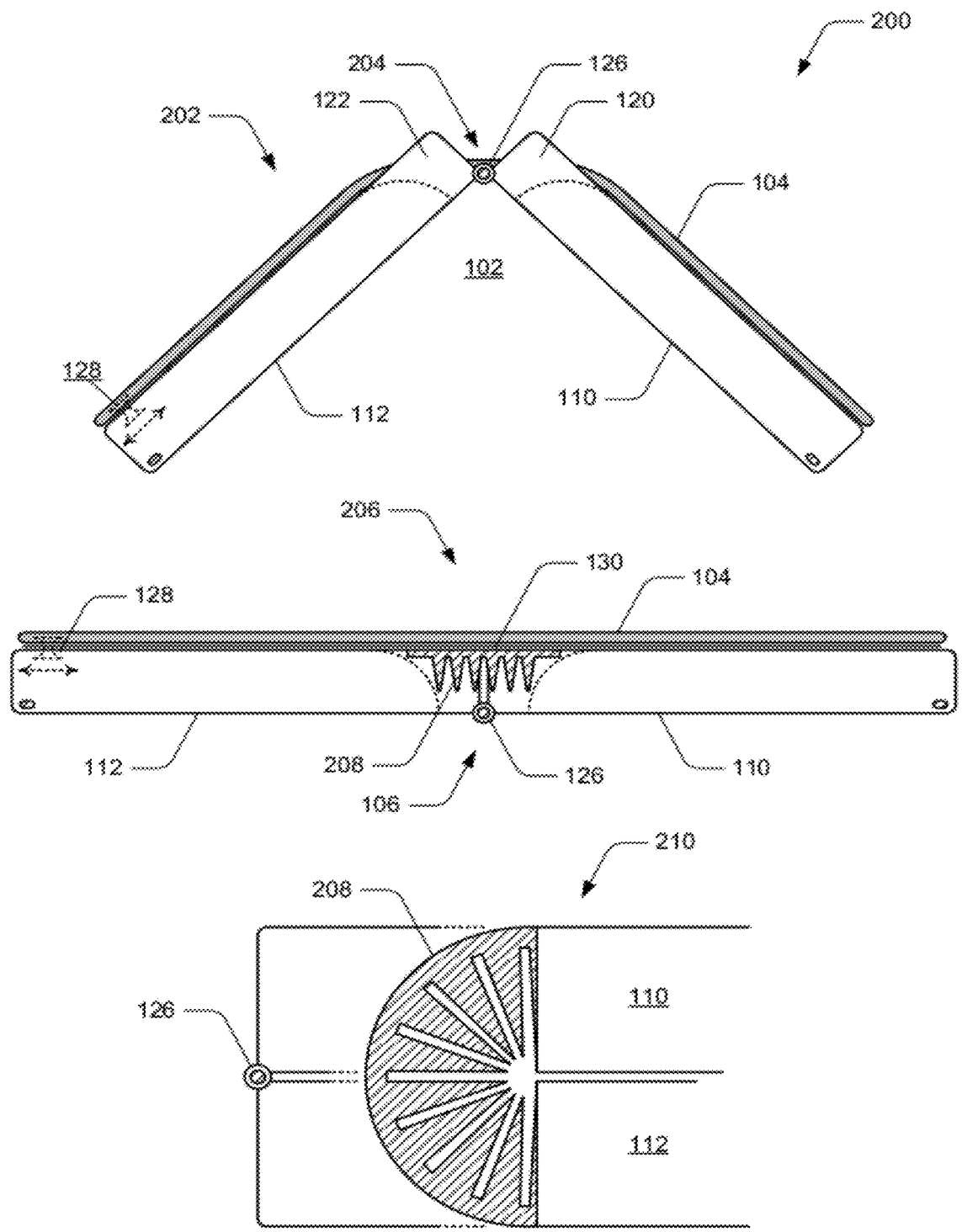
FIG. 2 further illustrates examples of the flexible display overcenter assembly in accordance with one or more embodiments.

FIG. 2 further illustrates examples 200 of the flexible display overcenter assembly described with reference to the foldable electronic device 102 shown in FIG. 1, and components described with reference to FIG. 1 are identified in FIG. 2. In a first view 202, the foldable electronic device 102 is shown as opening or closing to illustrate at 204 that the flexible display 104 bends through the pivot axis of the hinge assemblies 126. The flexible display passes through the pivot axis of the hinge assemblies, which allows for the sections of the flexible display that are integrated into the first and second housing parts to maintain the same relative position in the open and closed positions of the foldable electronic device. Additionally, the folded section of the flexible display is protected from environmental factors and/or external damage when folded around the first and second flanges of the flexible display overcenter assembly.

In a second view 206, the foldable electronic device is shown in the open position with the flexible backlight 130 under the flexible display to illuminate the flexible display. As described above, the flexible display may be implemented as a flexible OLED display without the need for the flexible backlight to illuminate the display. In embodiments, a flexure structure of pivotable links 208 can be utilized to support the flexible display in the open position of the foldable electronic device. The flexure structure of the pivotable links is also shown in a closed position at 210 between the first and second housing parts of the foldable electronic device.

Figure 3:
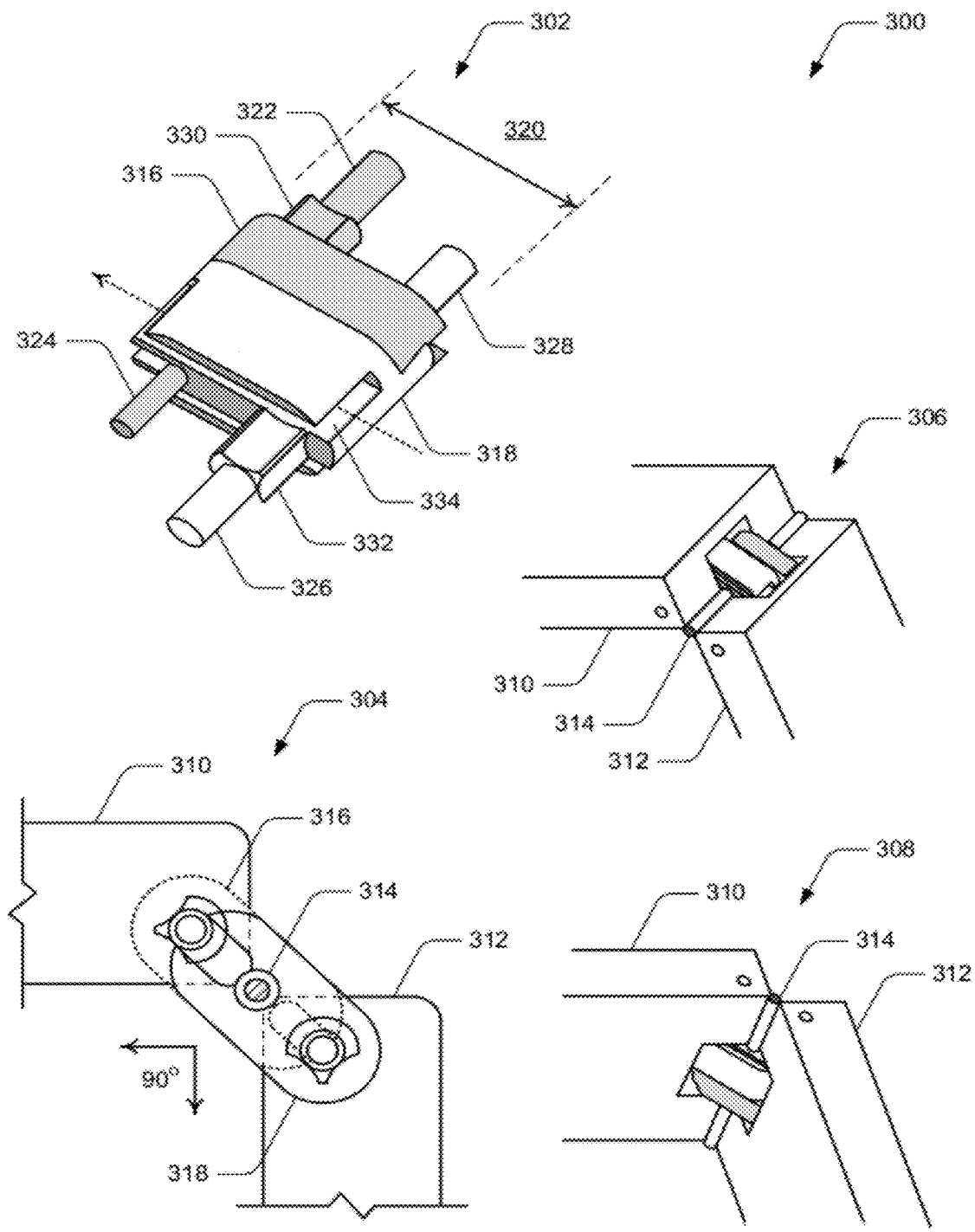
FIG. 3 illustrates an example of an extendable connecting link that can be implemented with a flexible display overcenter assembly in accordance with one or more embodiments.

FIG. 3 illustrates an example of an extendable connecting link 300 that can be implemented in a foldable electronic device as described herein. The extendable connecting link is shown non-extended at 302, and a cross-section of the extendable connecting link is shown extended at 304 (e.g., at approximately (90°). Additionally, the extendable connecting link is shown extended at 306 in a first view when the extendable connecting link is implemented in a foldable electronic device, and is also shown extended at 308 in a second view when implemented in the foldable electronic device.

The extendable connecting link 300 can be attached in a foldable electronic device, such as a cell phone or portable computer device, that has a first housing part 310 and a second housing part 312 that is movably coupled to the first housing part. In embodiments, a hinge 314, such as a small barrel hinge (also commonly referred to as a piano hinge), along with the extendable connecting link is operable to movably couple the first and second housing parts of the foldable electronic device. In this example, the housing parts of the foldable electronic device are movably coupled with the barrel hinge and the first and second link sections of the extendable connecting link. As an alternative to a barrel hinge, the hinge 314 may be implemented as any flexible connection of various materials that movably couples the housing parts of the portable device.

The extendable connecting link 300 has a first link section 316 and a second link section 318. The first and second link sections of the extendable connecting link interlock and slide-engage relative to each other to increase or decrease a length 320 of the extendable connecting link. The first link section includes pins 322, 324 that are designed to attach in the first housing part 310 of the foldable electronic device. The second link section includes pins 326, 328 that are also designed to attach in the second housing part 312 of the foldable electronic device.

One of the pins 322 of the first link section 316 includes a first integrated cam 330. Similarly, one of the pins 326 of the second link section 318 includes a second integrated cam 332. The extendable connecting link shown extended at 304 illustrates that the first link section has a U-shaped notch that engages a pin of the second link section. Similarly, the second link section has a U-shaped notch that engages pin of the first link section. The first and second cams apply a torque to open and close the first and second housing parts of the foldable electronic device relative to each other. The first and second cams rotate to apply the torque as the first and second link sections of the extendable connecting link rotate relative to the first and second housing parts of the foldable electronic device. The first and second cams also apply a first detent when the first and second housing parts of the foldable electronic device are opened relative to each other, and apply a second detent when the first and second housing parts of the foldable electronic device are closed relative to each other.

The first link section 316 and the second link section 318 of the extendable connecting link 300 can slide relative to each other to increase the length (e.g., shown extended at 304) of the extendable connecting link when the first and second housing parts of a foldable electronic device are opened from a closed position at zero degrees (0°) to ninety degrees (90°), and then when the first and second housing parts of the device are closed from an open position at one-hundred and eighty degrees (180°) back to ninety degrees (90°). Additionally, the first and second link sections can slide relative to each other to decrease the length of the extendable connecting link when the first and second housing parts of the foldable electronic device are closed from ninety degrees (90°) to the closed position at zero degrees (0°), and when the first and second housing parts of the device are opened from ninety degrees (90°) to the open position at one-hundred and eighty degrees (180°).

The extendable connecting link 300 also includes an interconnection channel 334 that routes an electrical interconnection between the first housing part 310 and the second housing part 312 of the foldable electronic device. In this example, the interconnection channel is formed in the second link section 318 that slide-engages the first link section 316. An electrical interconnection may include any one or combination of a flexible printed circuit, an electrical cable, an optical fiber, a coaxial cable, an antenna coaxial cable, or the flexible printed circuit bundled with any of the cables routed between the first and second housing parts of a foldable electronic device.

Figure 4:
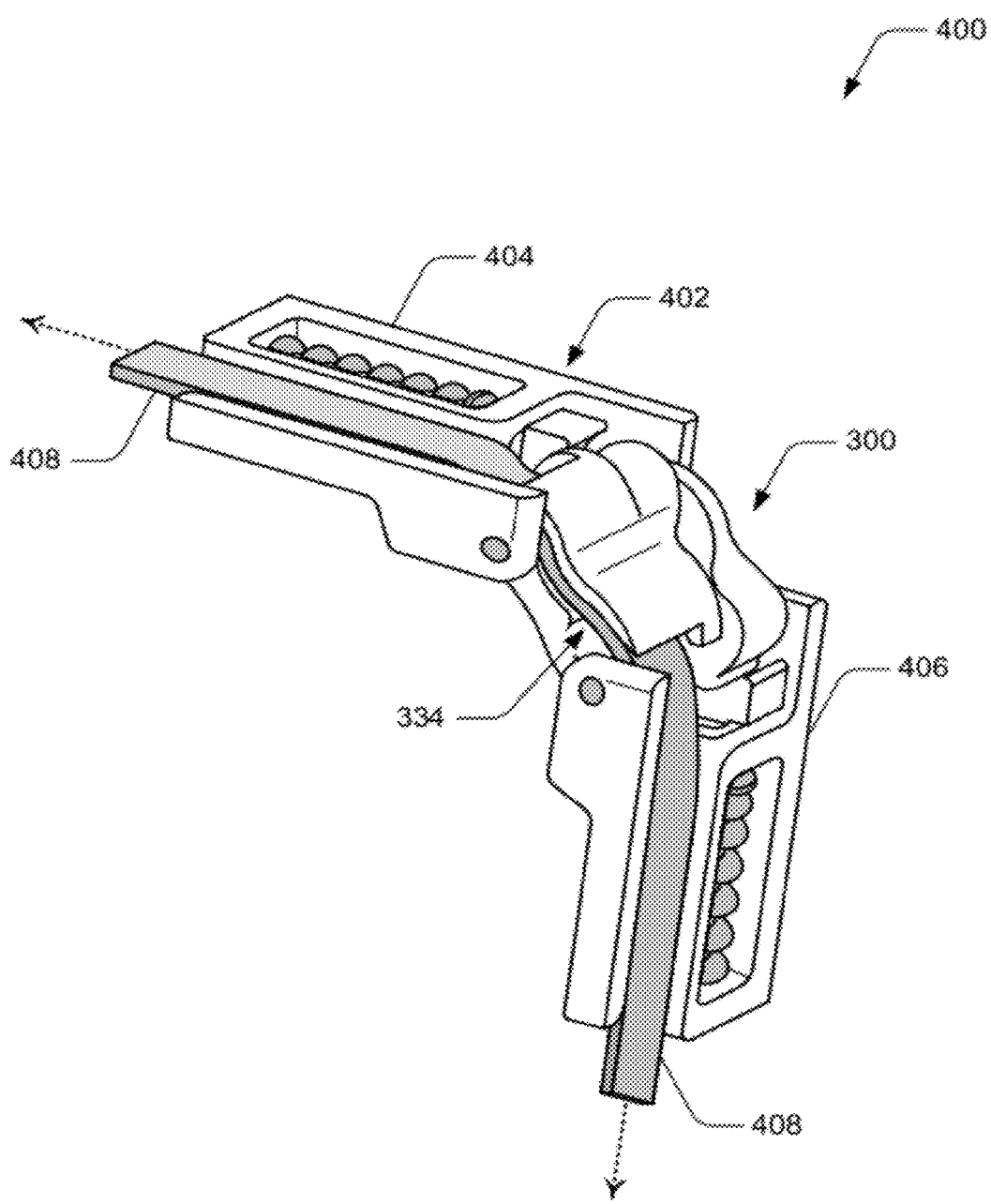
FIG. 4 further illustrates an example configuration of the extendable connecting link with an electrical interconnection in accordance with one or more embodiments.

FIG. 4 further illustrates an example configuration 400 of the extendable connecting link 300 shown in FIG. 3. The extendable connecting link is shown installed in a hinge chassis 402, and components described with reference to FIG. 3 are identified in FIG. 4. The hinge chassis has a first chassis half 404 and a second chassis half 406, both designed to attach to housing sections of a foldable electronic device. For example the first chassis half attaches to a first housing part of a foldable electronic device, and the second chassis half attaches to a second housing part of the foldable electronic device. The extendable connecting link is then operable to open and close the first and second housing parts of the device relative to each other.

In this example, the extendable connecting link 300 is shown extended, such as when the first and second housing parts of a foldable electronic device are positioned open at ninety degrees (90°). As described with reference to FIG. 3, the extendable connecting link includes the interconnection channel 334 that routes an electrical interconnection 408 between the first housing part and the second housing part of a foldable electronic device.

Figure 5:
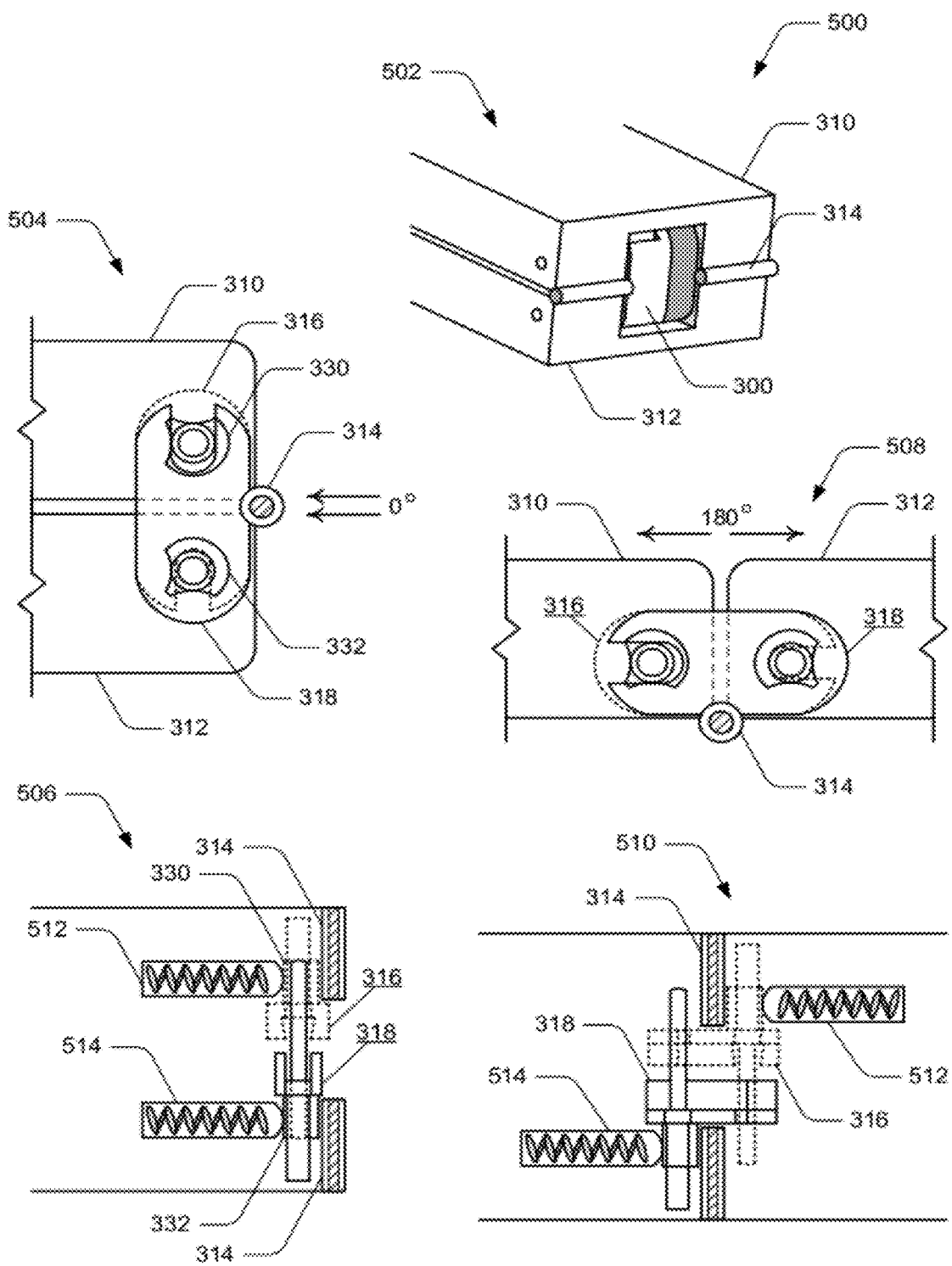
FIG. 5 further illustrates example configurations of the extendable connecting link in accordance with one or more embodiments.

FIG. 5 further illustrates example configurations 500 of the extendable connecting link 300 shown in FIGS. 3 and 4. The extendable connecting link is shown installed in a foldable electronic device and the device is shown in the closed position at 502. A cross-section of the extendable connecting link is shown non-extended when the foldable electronic device is in the closed position at 504 (e.g., at approximately (0°), and from a top view at 506. Additionally, the extendable connecting link is shown non-extended when the foldable electronic device is in an open position at 508 (e.g., at approximately (180°), and from a top view at 510. When the foldable electronic device is in the closed position or open at approximately one-hundred and eighty degrees (180°), the extendable connecting link is non-extended as shown at 504 and at 508.

As shown in the respective top views of the foldable electronic device in the closed position at 506 and in the open position at 510, the device includes a first cam-follower mechanism 512 with a spring to apply a force against the integrated cam 330 at the first link section 316 of the extendable connecting link. The foldable electronic device also includes a second cam-follower mechanism 514 with an additional spring to apply a force against the integrated cam 332 at the second link section 318 of the extendable connecting link. The integrated cams rotate as the first and second link sections of the extendable connecting link rotate relative to the first and second housing parts of the foldable electronic device. The cam-follower mechanisms apply the force to the integrated cams to implement a first detent when the device is opened, and to implement a second end-of-travel detent when the device is closed. In embodiments, the integrated cams and cam-follower mechanisms can be implemented as radial or axial cam mechanisms, and/or may be implemented for overcenter bistable motion.

Figure 6:
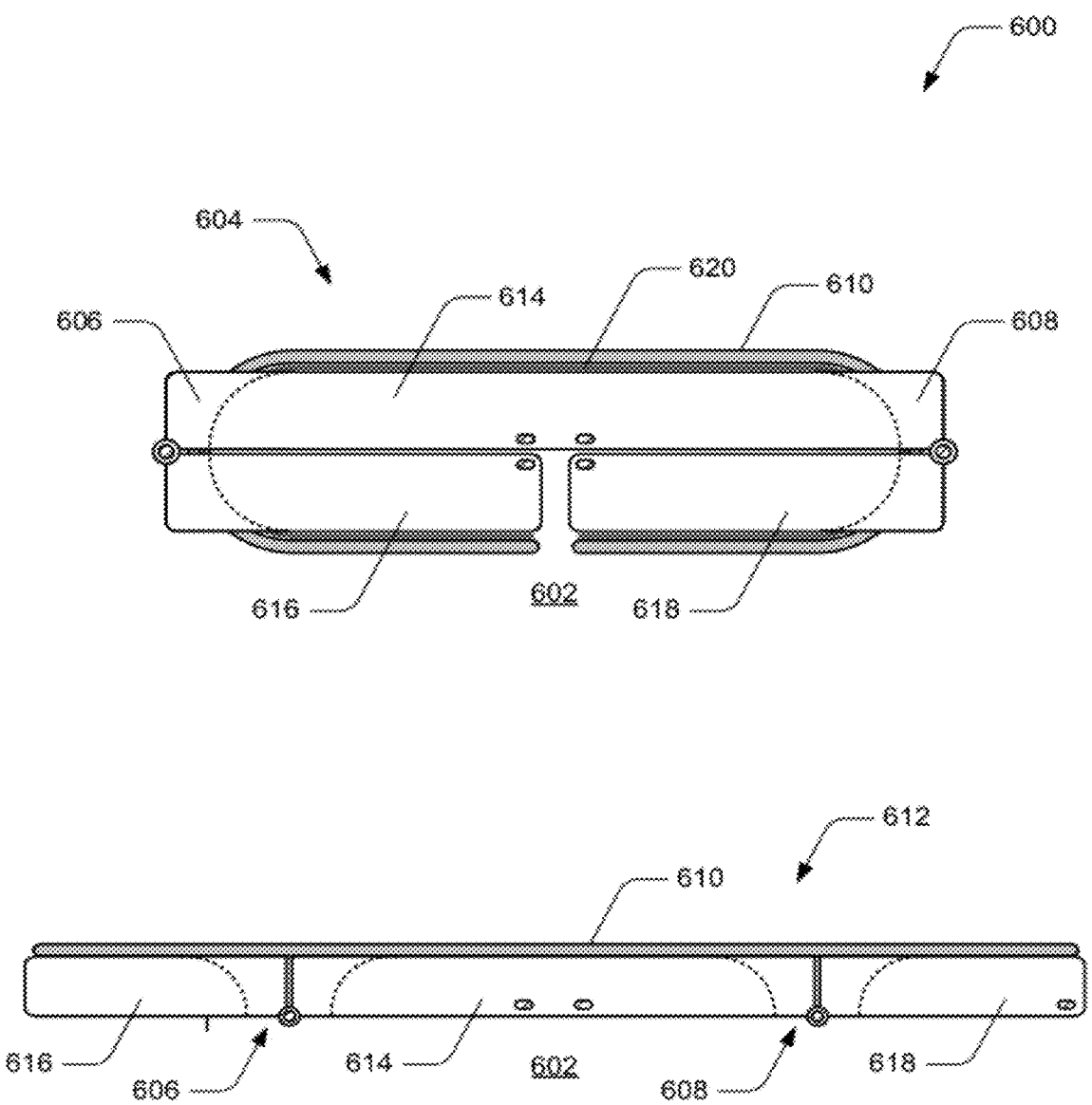
FIG. 6 illustrates an example of a flexible display overcenter assembly in accordance with one or more embodiments.

FIG. 6 illustrates examples 600 of a flexible display overcenter assembly in accordance with embodiments described herein. A foldable electronic device 602 is shown in a first view 604 in a closed position. In this example the foldable electronic device is a tri-fold device implemented with a first overcenter assembly 606 and a second overcenter assembly 608. Other embodiments may include a tri-fold electronic device folded in a configuration like a tri-fold wallet. The foldable electronic device 602 includes a flexible display 610 that bends and folds around both of the overcenter assemblies into the closed position of the device. The foldable electronic device is also shown in an open position of the device in a second view 612.

The first overcenter assembly 606 couples a first housing part 614 of the foldable electronic device to a second housing part 616 of the device. Similarly, the second overcenter assembly 608 couples the first housing part 614 of the foldable electronic device to a third housing part 618 of the device. The housing parts each include an integrated flange that folds to form a radius and support the flexible display in the closed position of the device.

The first housing part 614 is integrated with a first section of the flexible display, the second housing part 616 is integrated with a second section of the flexible display, and the third housing part 618 is integrated with a third section of the flexible display. The flexible display 610 can bend around the first overcenter assembly 606 as the first and second housing parts of the foldable electronic device are closed. Similarly, the flexible display can bend around the second overcenter assembly 608 as the first and third housing parts of the foldable electronic device are closed.

As described with reference to FIG. 1, the flexible display 610 may be implemented as a flexible LCD display that is illuminated with a flexible backlight 620, as shown in the view at 604 of the foldable electronic device 602 in the closed position. The flexible backlight bends under the flexible display and folds into the closed position of the foldable electronic device. Alternately, the flexible display may be implemented as a flexible OLED display that self-emits without the need for an integrated flexible backlight, as shown in the view at 612.

Figure 7:
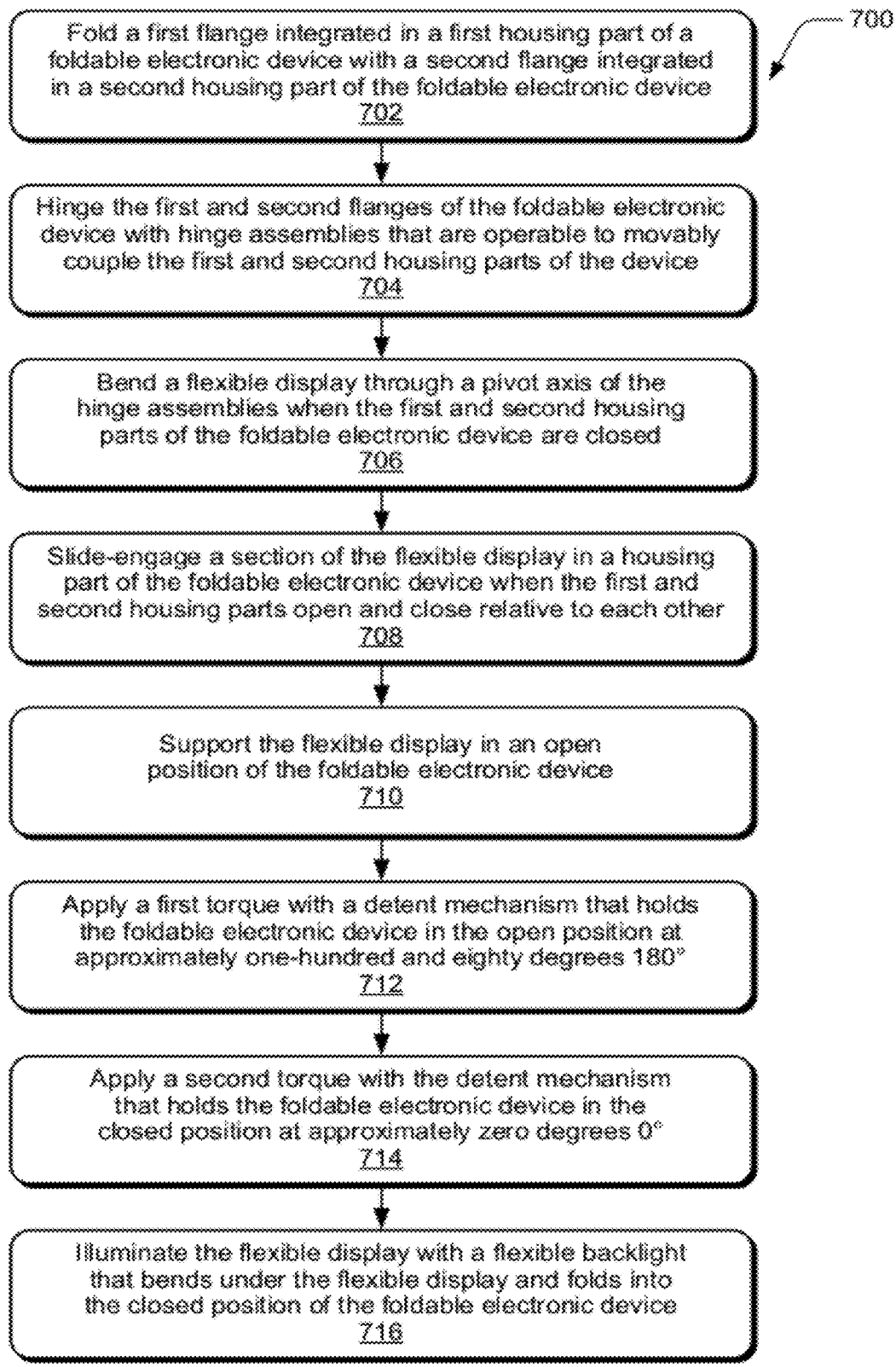
FIG. 7 illustrates example method(s) of a flexible display overcenter assembly in accordance with one or more embodiments.

FIG. 7 illustrates example method(s) 700 of a flexible display overcenter assembly. The order in which the method blocks are described are not intended to be construed as a limitation, and any number of the described method blocks can be combined in any order to implement a method, or an alternate method.

At block 702, a first flange is integrated in a first housing part of a foldable electronic device folded with a second flange that is integrated in a second housing part of the foldable electronic device. For example, the first housing part 110 of the foldable electronic device 102 (FIG. 1) is integrated with a first flange 120 of the flexible display overcenter assembly 106, and the second housing part 112 is integrated with a second flange 122 of the flexible display overcenter assembly. The first and second flanges fold and form a radius in the closed position of the device.

At block 704, the first and second flanges of the foldable electronic device are hinged with hinge assemblies that are operable to movably couple the first and second housing parts of the device. For example, the foldable electronic device 102 includes the hinge assemblies 126 that movably couple the first and second housing parts of the device.

At block 706, a flexible display bends through a pivot axis of the hinge assemblies when the first and second housing parts of the foldable electronic device are closed. For example, the flexible display 104 bends through the pivot axis of the hinge assemblies 126 when the first and second housing parts of the foldable electronic device are opened and closed.

At block 708, a section of the flexible display is slide-engaged in a housing part of the foldable electronic device when the first and second housing parts open and close relative to each other. For example, the section of the flexible display 104 that is integrated in the second housing part 112 of the foldable electronic device can be slide-engaged in the second housing part with a track and slide mechanism 128 to extend the flexible display to the end of the second housing part when the device is opened.

At block 710, the flexible display is supported in an open position of the foldable electronic device. For example, the flexure structure of pivotable links 208 (FIG. 2) supports the flexible display 104 in the open position of the foldable electronic device.

At block 712, a first torque is applied with a detent mechanism that holds the foldable electronic device in an open position at approximately one-hundred and eighty degrees 180°. At block 714, a second torque is applied with the detent mechanism that holds the foldable electronic device in the closed position at approximately zero degrees (0°). For example, the extendable connecting links 300 include a detent mechanism that applies a first torque to hold the foldable electronic device 102 in the open position, and applies a second torque to hold the foldable electronic device in the closed position.

At block 716, the flexible display is illuminated with a flexible backlight that bends under the flexible display and folds into the closed position of the foldable electronic device. For example, a flexible backlight 130 illuminates the flexible display 104, such as a flexible LCD display, and the flexible backlight bends under the flexible display and folds into the closed position of the foldable electronic device.

Figure 8:
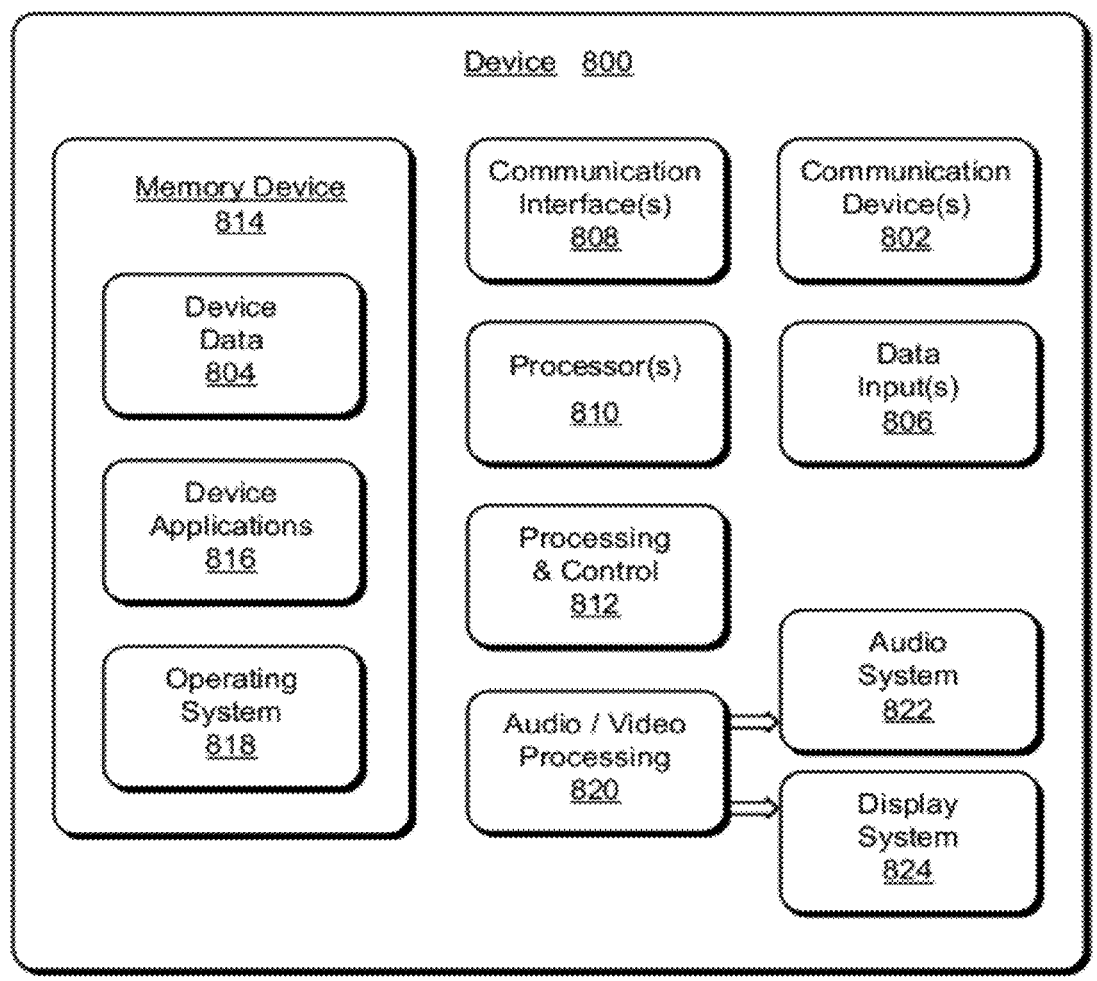
FIG. 8 illustrates various components of an example electronic device in which embodiments of a flexible display overcenter assembly can be implemented.

FIG. 8 illustrates various components of an example device 800 that can be implemented as any of the foldable electronic devices described with reference to the previous FIGS. 1-7. In embodiments, the device may be implemented as any one or combination of a fixed or mobile device, in any form of a consumer, computer, portable, user, communication, phone, navigation, television, appliance, gaming, media playback, and/or electronic device. The device may also be associated with a user (i.e., a person) and/or an entity that operates the device such that a device describes logical devices that include users, software, firmware, hardware, and/or a combination of devices.

The device 800 includes communication devices 802 that enable wired and/or wireless communication of device data 804, such as received data, data that is being received, data scheduled for broadcast, data packets of the data, etc. The device data or other device content can include configuration settings of the device, media content stored on the device, and/or information associated with a user of the device. Media content stored on the device can include any type of audio, video, and/or image data. The device includes one or more data inputs 806 via which any type of data, media content, and/or inputs can be received, such as user-selectable inputs and any other type of audio, video, and/or image data received from any content and/or data source.

The device 800 also includes communication interfaces 808, such as any one or more of a serial, parallel, network, or wireless interface. The communication interfaces provide a connection and/or communication links between the device and a communication network by which other electronic, computing, and communication devices communicate data with the device.

The device 800 includes one or more processors 810 (e.g., any of microprocessors, controllers, and the like) which process various computer-executable instructions to control the operation of the device. Alternatively or in addition, the device can be implemented with any one or combination of software, hardware, firmware, or fixed logic circuitry that is implemented in connection with processing and control circuits which are generally identified at 812. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 800 also includes one or more memory devices 814 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device.

Computer readable media can be any available medium or media that is accessed by a computing device. By way of example, and not limitation, computer readable media may comprise storage media and communication media. Storage media include volatile and non-volatile, removable and non-removable media implemented in any method or technology for storage of information, such as computer-readable instructions, data structures, program modules, or other data. Storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computer.

Communication media typically embody computer-readable instructions, data structures, program modules, or other data in a modulated data signal, such as carrier wave or other transport mechanism. Communication media also include any information delivery media. A modulated data signal has one or more of its characteristics set or changed in such a manner as to encode information in the signal. By way of example, and not limitation, communication media include wired media such as a wired network or direct-wired connection, and wireless media such as acoustic, RF, infrared, and other wireless media.

A memory device 814 provides data storage mechanisms to store the device data 804, other types of information and/or data, and various device applications 816. For example, an operating system 818 can be maintained as a software application with the memory device and executed on the processors. The device applications may also include a device manager, such as any form of a control application, software application, signal processing and control module, code that is native to a particular device, a hardware abstraction layer for a particular device, and so on.

The device 800 also includes an audio and/or video processing system 820 that generates audio data for an audio system 822 and/or generates display data for a display system 824, such as an integrated flexible display. The audio system and/or the display system may include any devices that process, display, and/or otherwise render audio, video, display, and/or image data. Display data and audio signals can be communicated to an audio device and/or to a display device via an RF (radio frequency) link, S-video link, composite video link, component video link, DVI (digital video interface), analog audio connection, or other similar communication link. In implementations, the audio system and/or the display system are integrated components of the example device. Alternatively, the audio system and/or the display system are external components to the device.

Although embodiments of a flexible display overcenter assembly have been described in language specific to features and/or methods, the subject of the appended claims is not necessarily limited to the specific features or methods described. Rather, the specific features and methods are disclosed as example implementations of a flexible display overcenter assembly.

The invention claimed is:

1. An overcenter foldable assembly, comprising:
   a first flange integrated in a first housing part of a foldable electronic device that includes a flexible display, the first housing part integrated with a first section of the flexible display;
   a second flange integrated in a second housing part of the foldable electronic device, the second housing part integrated with a second section of the flexible display, the first and second flanges being foldable to form a radius that supports the flexible display in a closed position of the foldable electronic device;
   a flexure structure, the flexure structure comprising pivotable links, that supports the flexible display in an open position of the foldable electronic device; and
   hinge assemblies that moveably couple the first housing part and the second housing part of the foldable electronic device, the flexible display that bends through a pivot axis of the hinge assemblies when the first and second housing parts of the foldable electronic device are closed.

2. An overcenter foldable assembly as recited in claim 1, wherein the first and second flanges are further configured to support the flexible display in an open position of the foldable electronic device.

3. An overcenter foldable assembly as recited in claim 1, wherein the second section of the flexible display is slide-engaged in the second housing part of the foldable electronic device.

4. An overcenter foldable assembly as recited in claim 1, further comprising extendable connecting links operable to movably couple the first and second housing parts of the foldable electronic device, the extendable connecting link including first and second link sections that slide relative to each other to increase or decrease a length of the extendable connecting link.

5. An overcenter foldable assembly as recited in claim 4, wherein the extendable connecting links and one or more cam-followers form a detent mechanism configured to apply a first torque to hold the foldable electronic device in an open position at approximately one-hundred and eighty degrees (180°), and further configured to apply a second torque to hold the foldable electronic device in the closed position at approximately zero degrees (0°).

6. An overcenter foldable assembly as recited in claim 4, wherein the extendable connecting links include an interconnection channel configured to route an electrical interconnection between the first and second housing parts of the foldable electronic device.

7. An overcenter foldable assembly as recited in claim 1, wherein the flexible display is illuminated with a flexible backlight that is configured to fold into the closed position of the foldable electronic device under the flexible display.

8. A foldable electronic device, comprising:
   a flexible display that folds into a closed position of the foldable electronic device;
   a first housing part integrated with a first section of the flexible display, the first housing part including a first flange;
   a second housing part integrated with a second section of the flexible display, the second housing part including a second flange, the first and second flanges being foldable to form a radius that supports the flexible display in a closed position of the foldable electronic device;
   a flexure structure, the flexure structure comprising pivotable links, that supports the flexible display in an open position of the foldable electronic device; and
   hinge assemblies that movably couple the first housing part and the second housing part of the foldable electronic device, the flexible display further configured to bend through a pivot axis of the hinge assemblies when the first and second housing parts of the foldable electronic device are closed.

9. A foldable electronic device as recited in claim 8, wherein the second section of the flexible display is slide-engaged in the second housing part of the foldable electronic device.

10. A foldable electronic device as recited in claim 8, further comprising extendable connecting links operable to movably couple the first and second housing parts of the foldable electronic device, an extendable connecting link comprising first and second link sections that slide relative to each other to increase or decrease a length of the extendable connecting link, the extendable connecting link including an interconnection channel configured to route an electrical interconnection between the first and second housing parts of the foldable electronic device.

11. A foldable electronic device as recited in claim 10, wherein the extendable connecting links and one or more cam-followers form a detent mechanism configured to apply a first torque to hold the foldable electronic device in an open position at approximately one-hundred and eighty degrees (180°), and further configured to apply a second torque to hold the foldable electronic device in the closed position at approximately zero degrees (0°).

12. A foldable electronic device as recited in claim 8, further comprising a third housing part integrated with a third section of the flexible display, wherein the foldable electronic device is tri-fold in the closed position with a first overcenter assembly that couples the first housing part to the second housing part and a second overcenter assembly that couples the first housing part to the third housing part.

13. A foldable electronic device as recited in claim 8, further comprising a flexible backlight configured to illuminate the flexible display, the flexible backlight further configured to fold into the closed position of the foldable electronic device under the flexible display.

14. A method, comprising:
   folding a first flange that is integrated in a first housing part of a foldable electronic device with a second flange that is integrated in a second housing part of the foldable electronic device, the foldable electronic device including a flexible display that is integrated in the first and second housing parts of the foldable electronic device;
   hinging the first and second flanges of the foldable electronic device with hinge assemblies that are operable to movably couple the first and second housing parts of the foldable electronic device, the flexible display bending through a pivot axis of the hinge assemblies, the first and second flanges forming a radius that supports the flexible display, when the first and second housing parts of the foldable electronic device are closed; and supporting the flexible display with a flexure structure of pivotable links capable of enabling the foldable electronic device to be placed in an open position.

15. A method as recited in claim 14, further comprising slide-engaging the second section of the flexible display in the second housing part of the foldable electronic device.

16. A method as recited in claim 14, further comprising:
applying a first torque with a cam-follower to an extendable connecting link to form a detent mechanism that holds the foldable electronic device in an open position at approximately one-hundred and eighty degrees (180°); and applying a second torque with the cam-follower to the extendable connecting link to form the detent mechanism that holds the foldable electronic device in the closed position at approximately zero degrees (0°).

17. A method as recited in claim 14, further comprising illuminating the flexible display with a flexible backlight that bends under the flexible display and folds into the closed position of the foldable electronic device.

* * * * *